Sept. 20, 1966     E. F. ELLIS     3,273,418
VEHICLE PARKING BRAKE CONTROL
Filed Dec. 12, 1963     4 Sheets-Sheet 1

INVENTOR.
Elmer F. Ellis

INVENTOR.
Elmer F. Ellis.

Sept. 20, 1966  E. F. ELLIS  3,273,418
VEHICLE PARKING BRAKE CONTROL
Filed Dec. 12, 1963  4 Sheets-Sheet 4

INVENTOR.
Elmer F. Ellis

United States Patent Office 3,273,418
Patented Sept. 20, 1966

3,273,418
VEHICLE PARKING BRAKE CONTROL
Elmer F. Ellis, 15722 Wisconsin, Detroit, Mich.
Filed Dec. 12, 1963, Ser. No. 330,127
3 Claims. (Cl. 74—539)

This invention relates to foot-operated brake mechanisms, particularly to foot operated parking brakes of the pawl and ratchet type, adapted for use in automotive vehicles.

It is an object of the invention to provide a novel and improved parking brake control mechanism which eliminates the need for an extra driver operated release mechanism such as the brake releasing lever or button, and in which successive actuations of the same member, such as the foot operated pedal applies and then releases the brake without requiring additional pedal travel beyond the extreme normal applied position or the extreme released position of a manually released pedal.

It is an object of this invention to provide an automatically releasing type brake in which the pedal requires no more room in a vehicle for pedal travel than if it were manually released.

It is a further object of the invention to provide a singularly simple mechanism for accomplishing the above specifications, it requiring, besides the standard ratchet, pawl, and pedal of the manually released brake, but two moving parts, a brake lever and a bell crank with their control springs.

It is a further object that this invention may be used on a hand brake lever by reversing the mechanism to accommodate a pulling motion to apply the brake instead of a pushing motion as of the foot.

Operation of the brake with its releasing mechanism is better understood by reference to the drawings in which.

Figure 5:
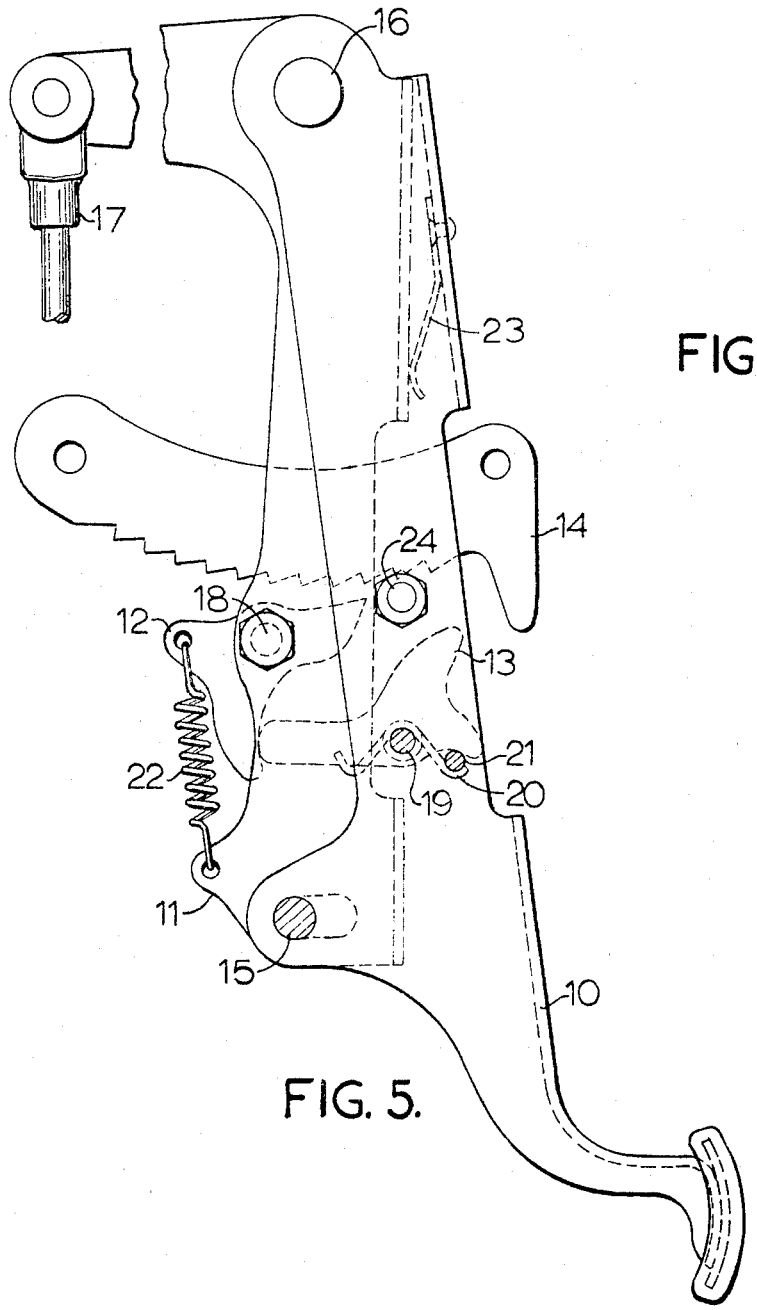
FIGURE 5 shows the same principle accomplished with stampings instead of castings as illustrated in FIGURES 1, 2, 3, 4 and 7.

In all drawings the optional design of supporting brackets mounting the brake mechanism in a vehicle have been omitted for the sake of clarity, as is also the stop limiting pedal travel in the brake releasing direction in all drawings except FIGURE 5.

Referring more in detail to the drawings, 10 is the brake pedal, swingably mounted on cross shaft 16. It has means for mounting a pivot 19 to support a bell crank lever 13, and a stud 21, which acts as a stop for bell crank lever 13 and anchor for torsion spring 20. It also has a blind drill hole for holding compression spring 23. Brake lever 11, also swingably mounted on cross shaft 16, has an arm extending forward (in this case) for actuating brake rod or cable 17. It also has means for mounting a pivot 18, to support the pawls 12, and a stop 15 for limiting the extent the pedal 10 can swing away from the brake lever 11. It also has a small drill hole for anchoring pawl return spring 22 and a blind drill hole for holding compression spring 23.

Figure 1:
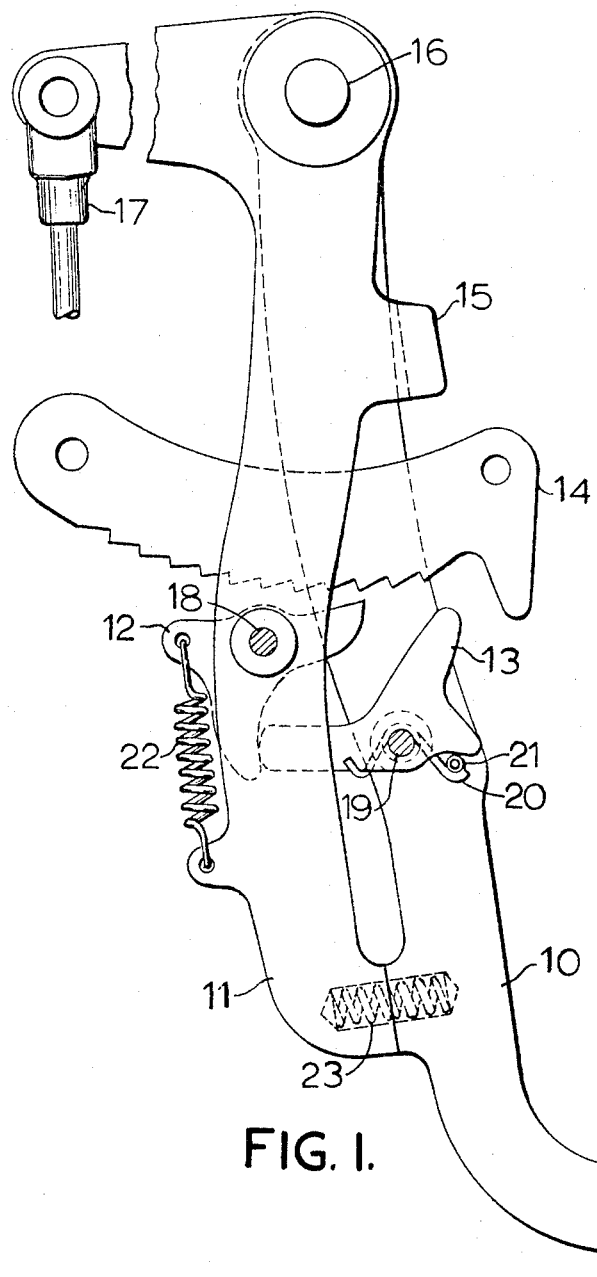
FIGURE 1 is a side elevation of the brake mechanism as it is being eased back toward the fully released position.
Figure 2:
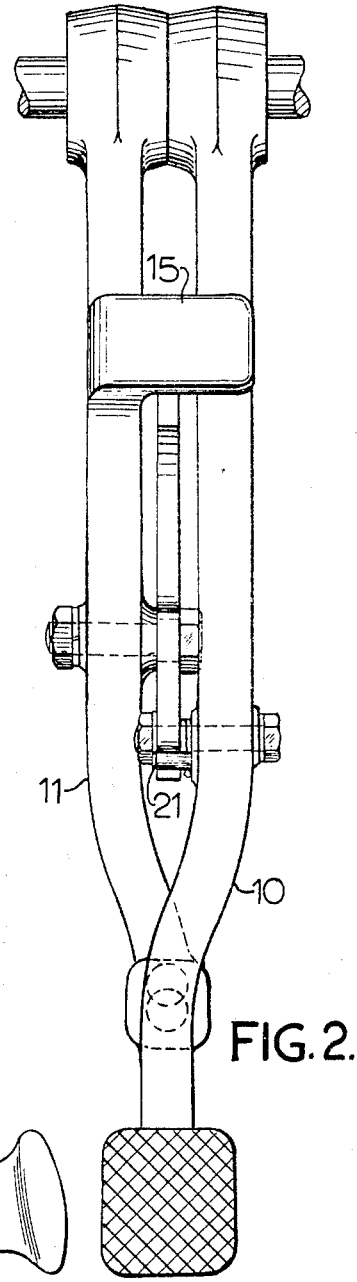
FIGURE 2 is a view, from the rear, of the mechanism shown in FIGURE 1.
Figure 3:
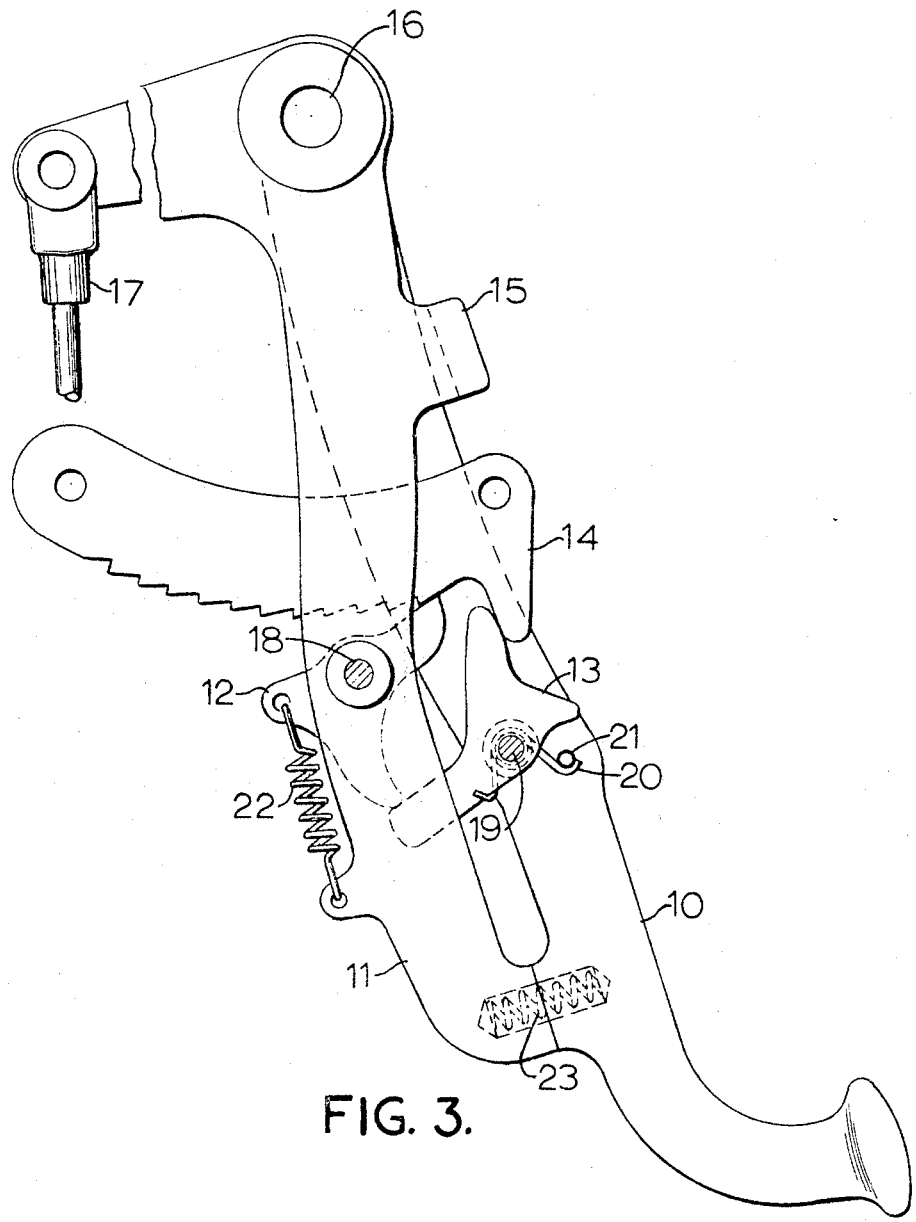
FIGURE 3 is a side elevation of the mechanism after it has reached the fully released position and is ready for a brake application.

In FIGURE 1 the bell crank 13 has revolved the pawl 12 to the position where it cannot make contact with the teeth of ratchet 14 and the mechanism is returning to the fully released position shown in FIGURE 3.

In FIGURE 3 the vertical arm of the bell crank lever 13 has made contact with the downward projection of ratchet 14 and has been moved on pivot 19 in a counter clockwise direction until it released pawl 12 permitting return spring 22 to bring the pawl 12 into contact with the teeth of ratchet 14. Thus the mechanism is shown in the fully released position ready for a brake application.

Figures 4, 7:
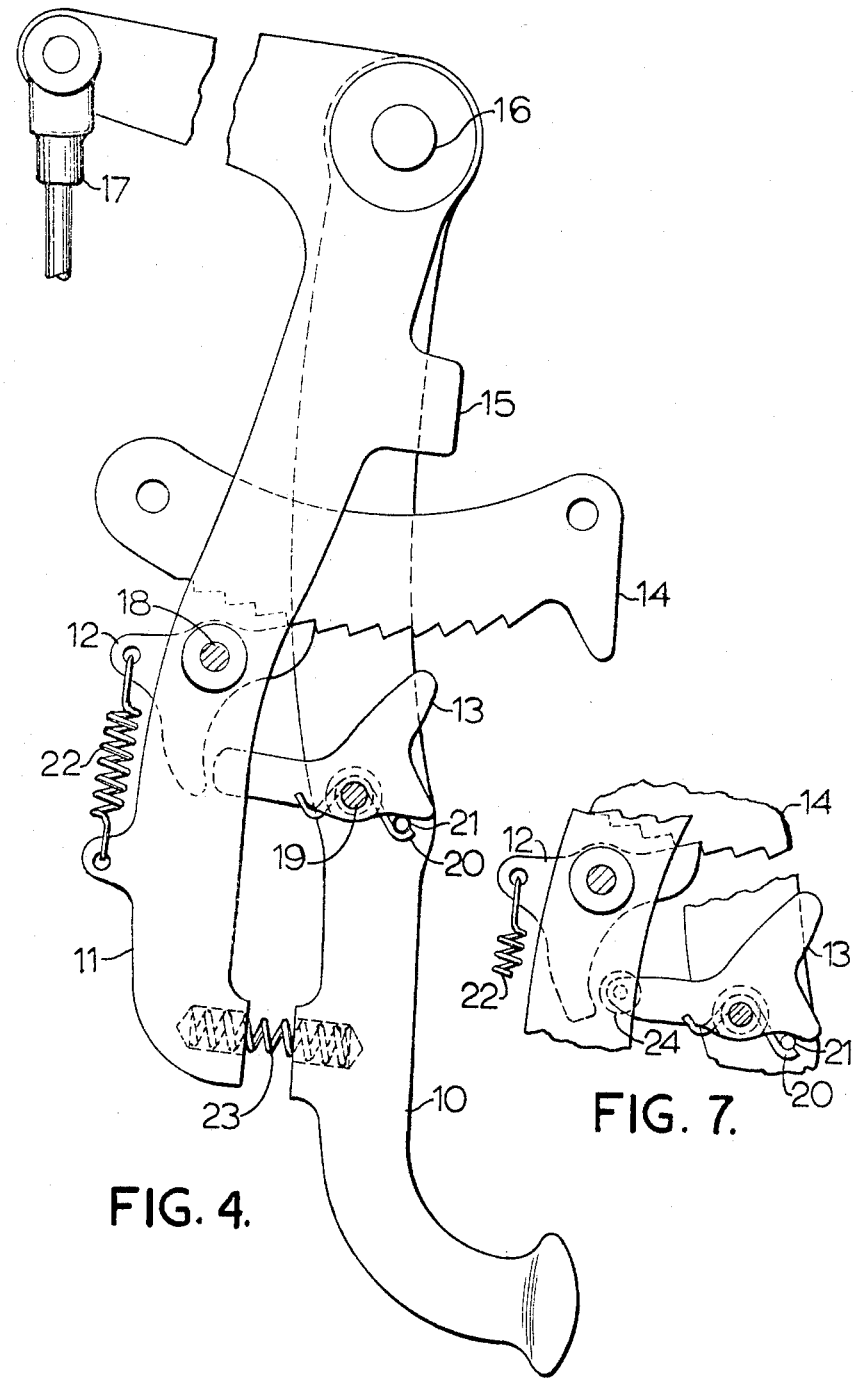
FIGURE 4 is a side elevation of the mechanism as it would be with the brake set. With the brake set and mechanism in this position a slight pressure on the pedal will release the brake by moving the pawl out of contact with the ratchet teeth and start the assembly on the way back as shown in FIGURE 1, to the fully released position shown in FIGURE 3.
FIGURE 7 is a partial view showing pawl and bell crank lever with a friction-reducing roller to contribute to ease of operation.

In FIGURE 4 the brake has been fully set, the foot pressure on pedal 10 has been removed, the pawl 12 has indexed along the teeth of ratchet 14 and locked the brake lever 11 and the brakes in fully applied position and pedal spring 23 has moved the pedal 10 away from brake lever 11 against stop 15 which movement has permitted bell crank lever 13 to spring against stop stud 21 bringing the horizontal arm of bell crank lever 13 into position to release pawl 12 from the ratchet 14 upon a slight application of pressure on pedal 10. The mechanism is then in position to be returned to fully released position shown in FIGURE 3.

In FIGURE 5 the principle and positioning of the mechanism is the same as in FIGURE 1 but shows the possibility of stamped construction instead of cast construction. Other slight changes are shown in compression pedal spring 23 and in pedal movement limiting stop 15. A flat pedal return spring 23 of FIGURE 5 is substituted for the compression spring 23 of FIGURE 1. Stop bolt 15 acting in slotted hole in brake lever 11 has been substituted for cast stop 15 of FIGURE 1.

Figure 6:
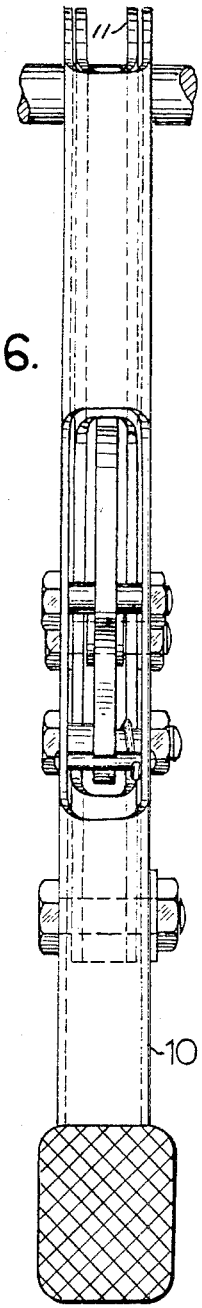
FIGURE 6 is a view from rear of mechanism shown in FIGURE 5.

A stop bolt 24 limits return movement of mechanism to brake released position by contact with downward projection of ratchet 14 and incidentally reinforces mid section of stamped brake lever 10. In all figures, except FIGURES 5 and 6 a stop for entire mechanism may be incorporated in supporting bracket not shown.

It is apparent that the presentation herein disclosed shows certain forms of the invention. It is easily appreciated that it is susceptible to change, modification or slight variations that nevertheless come within the scope of the claims which follow.

What is claimed is:

1. In a mechanism for operating a parking brake or the like of a vehicle, including in combination, a stationary support, a ratchet immovably fixed to said support, a first member swingably mounted to said support and with suitable means to connect it with a brake operating cable or rod and adapted to be moved between a brake released position and a brake applied position, a pawl pivotally mounted on said first member with resilient means urging said pawl into engagement with said ratchet for holding said first member in brake applied position, a second member also swingably mounted on said stationary support and adapted to push said first member in a brake applying direction and also to swing away from said first member, when said first member is held in the brake applied position, a distance limited by a stop between said first and second members, which is just sufficient to allow a pawl controlling lever, pivotally mounted on said second member, to move to such position that a slight subsequent movement of said second member in brake applying direction will cause said pawl controlling lever to move said pawl out of contact with said ratchet, thus permitting the mechanism to move to brake released position from where the first movement of said second member immediately imparts movement to brake operating cable or rod in a brake applying direction.

2. In a mechanism of the pawl and ratchet type for operating a parking brake or the like of a vehicle, including in combination a stationary support, a ratchet immovably fixed to said stationary support, a brake lever swingably mounted to said support, and with suitable means to connect it with a brake operating cable or rod, and adapted to be moved between a brake released position and a brake applied position, a pawl pivotally mounted on said brake lever with resilient means urging said pawl into contact with said ratchet for holding said brake lever in brake applied position, a brake pedal, also swingably mounted on said stationary support and not only adapted to apply force on said brake lever in brake applying direction but also to swing away from said brake lever on urging of resilient means between them, when said brake lever is held by said pawl in a brake applied position, a distance limited by an appropriate stop between said brake lever and said pedal just sufficient to permit a pawl controlling lever, pivotally mounted on said pedal, to pivot to a position from which motion imparted to said pedal in a brake applying direction will cause said pawl controlling lever to force said pawl out of contact with said ratchet, permitting the mechanism to be eased back to brake released position, said pawl controlling lever being of such design that when mechanism reaches the brake released position said pawl controlling lever will have been pivoted by contact with appropriate projection on said ratchet or other non-moving part to position in which said pawl is released to make contact with said ratchet and, in which position said pawl is of such design that it will hold said pawl controlling lever in inoperative position while mechanism is in brake released position and during foot application of brake.

3. In a parking brake operating mechanism of the pawl and ratchet type for use in an automotive vehicle, including in combination, a stationary support, a ratchet immovably fixed to said support, a U-shaped sheet metal stamping forming a brake lever with arm suitable to be connected to a brake operating cable or rod and adapted to be moved between a brake released position and a brake applied position, a pawl pivotally mounted on said brake lever with resilient means urging said pawl into contact with said ratchet for holding said brake lever in brake applied position, a second U-shaped sheet metal stamping forming a brake foot pedal, also swingably mounted on said stationary support and adapted to apply force on said brake lever in brake applying direction and also to swing away from said brake lever on urging of resilient means between them, when said brake lever is held in brake applying position by said pawl, a distance limited by an appropriate stop, just sufficient to permit a pawl controlling lever, pivotally mounted on said brake pedal, to move to such position that a slight subsequent movement of said brake pedal in brake applying direction will cause said pawl controlling lever to remove said pawl from contact with said ratchet and permit the mechanism to return to brake released position from where the first movement of said brake pedal immediately imparts movement to said brake operating rod or cable in direction of applying the brake.

References Cited by the Examiner

UNITED STATES PATENTS

| | | | |
|---|---|---|---|
| 656,494 | 8/1900 | Wheeler | 74—537 |
| 1,709,842 | 4/1929 | Dodge et al. | 74—535 X |
| 2,281,155 | 4/1942 | Jandus et al. | 74—537 |
| 2,520,759 | 8/1950 | Duma | 74—539 |

References Cited by the Applicant

UNITED STATES PATENTS

| | | |
|---|---|---|
| 1,939,221 | 12/1933 | Nelson. |
| 2,228,570 | 1/1941 | Johnson. |
| 2,905,024 | 9/1959 | McCarthy et. al. |
| 2,977,818 | 4/1961 | Strozik. |
| 2,986,046 | 5/1961 | Vigmostad. |
| 3,003,365 | 10/1961 | McKenzie. |
| 3,011,361 | 12/1961 | Hinsey. |

FRED C. MATTERN, JR., *Primary Examiner.*

MILTON KAUFMAN, *Examiner.*

C. F. GREEN, *Assistant Examiner.*